(12) United States Patent
Chen et al.

(10) Patent No.: US 11,360,607 B2
(45) Date of Patent: Jun. 14, 2022

(54) TOUCH DEVICE

(71) Applicant: Anhui Hongcheng Opto-Electronics Co., Ltd., Bengbu (CN)

(72) Inventors: Tingfeng Chen, Bengbu (CN); Junde Dai, Bengbu (CN); Xinyi Liu, Bengbu (CN)

(73) Assignee: Anhui Hongcheng Opto-Electronics Co., Ltd., Bengbu (CN)

( * ) Notice: Subject to any disclaimer, the term of this patent is extended or adjusted under 35 U.S.C. 154(b) by 0 days.

(21) Appl. No.: 17/122,577

(22) Filed: Dec. 15, 2020

(65) Prior Publication Data
US 2022/0083168 A1 Mar. 17, 2022

(30) Foreign Application Priority Data
Sep. 16, 2020 (CN) .......................... 202010972643.8

(51) Int. Cl.
*G06F 3/042* (2006.01)
(52) U.S. Cl.
CPC ................................. *G06F 3/0421* (2013.01)
(58) Field of Classification Search
CPC ................ G06F 3/0421; G06F 2203/04103
See application file for complete search history.

(56) References Cited

U.S. PATENT DOCUMENTS

| | | | |
|---|---|---|---|
| 2009/0257183 A1* | 10/2009 | Yang | G06F 1/1639 361/679.27 |
| 2010/0208940 A1* | 8/2010 | Takman | G01L 5/243 382/103 |
| 2015/0253495 A1* | 9/2015 | Matsumoto | G06F 3/0412 345/174 |
| 2019/0079637 A1* | 3/2019 | Kocovski | G06F 3/0421 |

FOREIGN PATENT DOCUMENTS

CN 206163041 U 5/2017

\* cited by examiner

*Primary Examiner* — Patrick N Edouard
*Assistant Examiner* — Joseph P Fox

(57) ABSTRACT

The present disclosure provides a touch device. The touch device includes a frame, a substrate, an infrared emitting unit, and an infrared receiving unit. The infrared emitting unit and the infrared receiving unit are disposed on the frame and located above the substrate. The touch device also includes: a connecting block which is connected at an edge region on a lower surface of the substrate, and an adjusting member which connects the connecting block and the frame and adjusts a lateral tensile force applied by the adjusting member to the substrate. The touch device of the present disclosure ensures the flatness of the substrate by the connecting block in cooperation with the adjusting member, avoiding the influence of the substrate on the infrared light, and has a simple structure and is convenient to assemble.

8 Claims, 6 Drawing Sheets

TOUCH DEVICE

CROSS-REFERENCE TO RELATED APPLICATION

This application is based on and claims priority to Chinese Patent Application No. 202010972643.8 filed on Sep. 16, 2020, which is incorporated herein by reference in its entirety.

TECHNICAL FIELD

The present disclosure relates to the field of electronic equipment, in particular to a touch device.

BACKGROUND

Nowadays, the infrared emitting unit and the infrared receiving unit included in the optical touch sensitive system are generally disposed above the substrate. If the substrate is bent upward, it may refract or reflect the infrared light and affect the propagation of the infrared light. In order to avoid the influence of the substrate on the infrared light, the existing touch apparatus adopts a configuration in which the substrate is bent downward. In order to make the curvature of the substrate controllable, related components is required to be provided. The substrate bent downward is complicated to install, and the detection of the curvature is time-consuming and labor-intensive.

SUMMARY

In view of above, the present disclosure provides a touch device, which can ensure the flatness of the substrate by applying a lateral tensile force to the substrate, thereby avoiding the influence of the substrate on infrared light.

An embodiment of the present disclosure provides a touch device, including a frame, a substrate, an infrared emitting unit and an infrared receiving unit, the infrared emitting unit and the infrared receiving unit being disposed on the frame and located above the substrate. The touch device further includes: a connecting block which is connected at an edge region on a lower surface of the substrate, and an adjusting member which connects the connecting block and the frame and adjusts a lateral tensile force applied by the adjusting member to the substrate.

According to some embodiments of the present disclosure, the adjusting member is a screw, a threaded hole is provided on the connecting block, a screw mounting hole corresponding to the threaded hole is provided on the frame, and the screw passes through the screw mounting hole to connect to the threaded hole.

According to some embodiments of the present disclosure, the connecting block is bonded to the lower surface of the substrate.

According to some embodiments of the present disclosure, the connecting block is inserted into the substrate.

According to some embodiments of the present disclosure, a fitting hole is provided at the edge region on a side of the substrate facing the connecting block, a fitting column corresponding to the fitting hole is provided on the frame, and the fitting column is inserted into the fitting hole.

According to some embodiments of the present disclosure, a first elastic member is provided between the frame and a nut of the screw.

According to some embodiments of the present disclosure, the frame includes a connecting-block mounting groove, and the connecting-block mounting groove includes an inner wall with a first inclined surface; and the connecting block includes a second inclined surface corresponding to the first inclined surface, the connecting block is disposed in the connecting-block mounting groove, and a second elastic member is disposed between the first inclined surface and the second inclined surface.

According to some embodiments of the present disclosure, the first inclined surface is disposed on a bottom surface of the connecting-block mounting groove, the second inclined surface is disposed on a bottom surface of the connecting block, and the screw is connected to the threaded hole from bottom to top in a vertical direction.

According to some embodiments of the present disclosure, the first inclined surface is disposed on a side wall of the connecting-block mounting groove, the second inclined surface is disposed on a side wall of the connecting block, and the screw is connected to the threaded hole obliquely upward.

According to some embodiments of the present disclosure, the screw has an inclination angle of 45°.

In the touch device of the present disclosure, the connecting block is disposed at the edge region of the substrate, and the lateral tensile force applied to the substrate can be adjusted by the adjusting member, thereby ensuring the flatness of the upper surface of the substrate, such that the substrate does not affect the propagation of infrared rays; by means of cooperation between the adjusting member and the connecting block, the flatness of the substrate can be ensured, inspection procedure in the assembly process can be reduced, and the cost of the touch device can be lowered.

DESCRIPTION OF THE DRAWINGS

In order to illustrate the technical solutions in the embodiments of the present disclosure more clearly, the following brief explanations are made to the drawings needed in the description of the embodiments. Apparently, the drawings in the following description are only intended to illustrate some embodiments of the present disclosure. For those ordinary skilled in the art, other drawings can be obtained based on these drawings, without exceeding the protection scope claimed in the present disclosure.

DETAILED DESCRIPTION

The technical solutions in the embodiments of the present disclosure will be described clearly and completely in conjunction with the accompanying drawings in the embodiments of the present disclosure. Apparently, the described embodiments are some embodiments of the present disclosure, rather than all the embodiments. Based on the embodiments in the present disclosure, all other embodiments obtained by those skilled in the art without creative labor shall fall within the protection scope of the present disclosure.

The present disclosure provides a touch device including a frame, a substrate, an infrared emitting unit, and an infrared receiving unit. The infrared emitting unit and the infrared receiving unit are disposed on the frame and located above the substrate. The touch device also includes a connecting block and an adjusting member. The connecting block is disposed on an edge region on a lower surface of the substrate. The adjusting member is connected with the connecting block and the frame, and adjusts a lateral tensile force applied by the adjusting member to the substrate. The substrate is subjected to lateral tensile force, and therefore, can ensure the flatness of the upper surface of the substrate.

Embodiment 1

Figure 1:
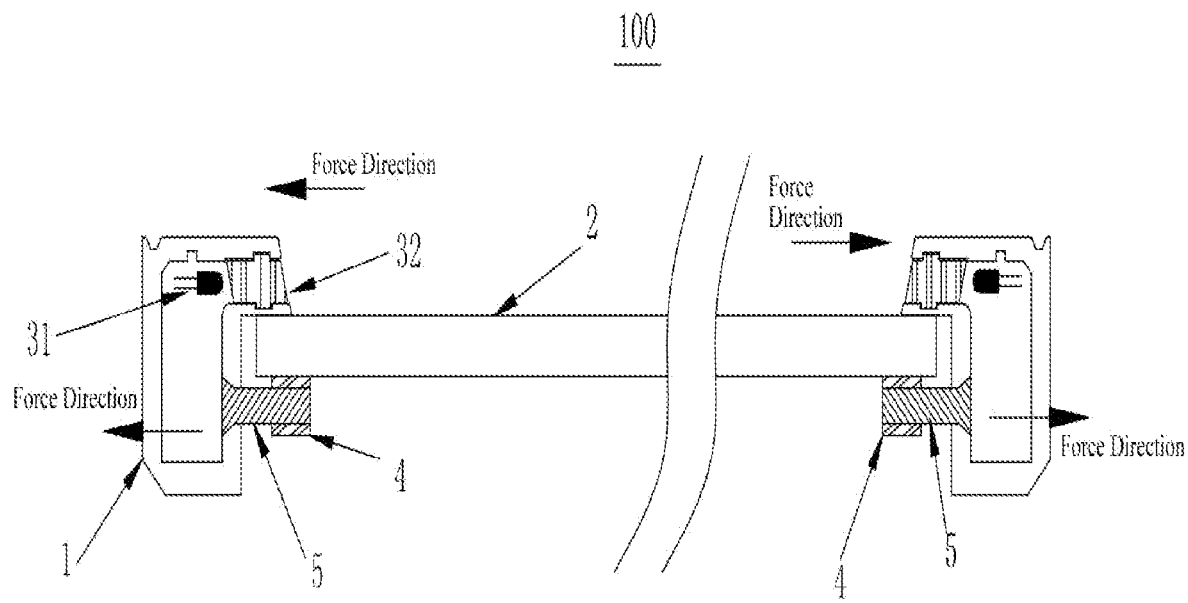
FIG. 1 is a schematic view of a touch device according to an embodiment of the present disclosure.
Figure 2:
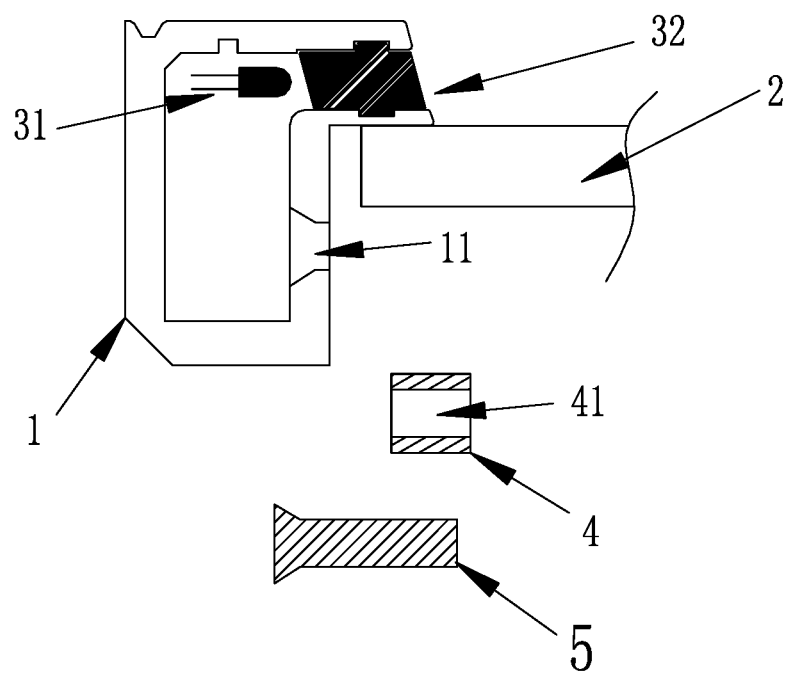
FIG. 2 is an exploded view of the touch device according to the embodiment of the present disclosure.

As shown in FIG. 1 and FIG. 2, the touch device 100 according to this embodiment includes a frame 1, a substrate 2, an infrared emitting unit 31, an infrared receiving unit 32, a connecting block 4 and an adjusting member 5.

The frame 1 is located around the periphery of the substrate 2. The frame 1 may be made of conventional profiles and can support various components of the touch device 100. The substrate 2 may be made of tempered glass. The infrared emitting unit 31 and the infrared receiving unit 32 are disposed on the frame 1 and located above the substrate 2. The infrared emitting unit 31 may be selected from an infrared lamp, and the infrared receiving unit 32 may be selected from an infrared sensing strip. The touch object can achieve the touch operation by changing the infrared rays on the contact points.

The connecting block 4 is connected at an edge region on the lower surface of the substrate 2. The connecting block 4 may be an aluminum block. Alternatively, other metal materials are possible. In an optional implementation, an upper surface of the connecting block 4 is bonded to the lower surface of the substrate 2, for example, by AB glue.

In this embodiment, the adjusting member 5 is a screw, a horizontal threaded hole 41 is provided on the connecting block 4, and a screw mounting hole 11 corresponding to the threaded hole 41 is provided on the frame 1. In this embodiment, the screw mounting hole 11 is a counter bore. When assembled, the screw passes through the screw mounting hole 11 to connect to the threaded hole 41. A plurality of connecting blocks 4 and a plurality of corresponding screws connected with the connecting blocks 4 are uniformly disposed at the edge region around the substrate 2. By rotating the screws, the lateral tensile force subjected by the substrate 2 can be adjusted, thereby the flatness of the substrate 2 assembled on the frame 1 can be adjusted, such that the flatness of the substrate 2 can reach the expected value. The direction of the lateral tensile force is indicated by the arrow in the figures. Alternatively, the adjusting member 5 may also select other forms of structural members, as long as the lateral tensile force can be applied to the substrate 2.

Embodiment 2

Figure 3:
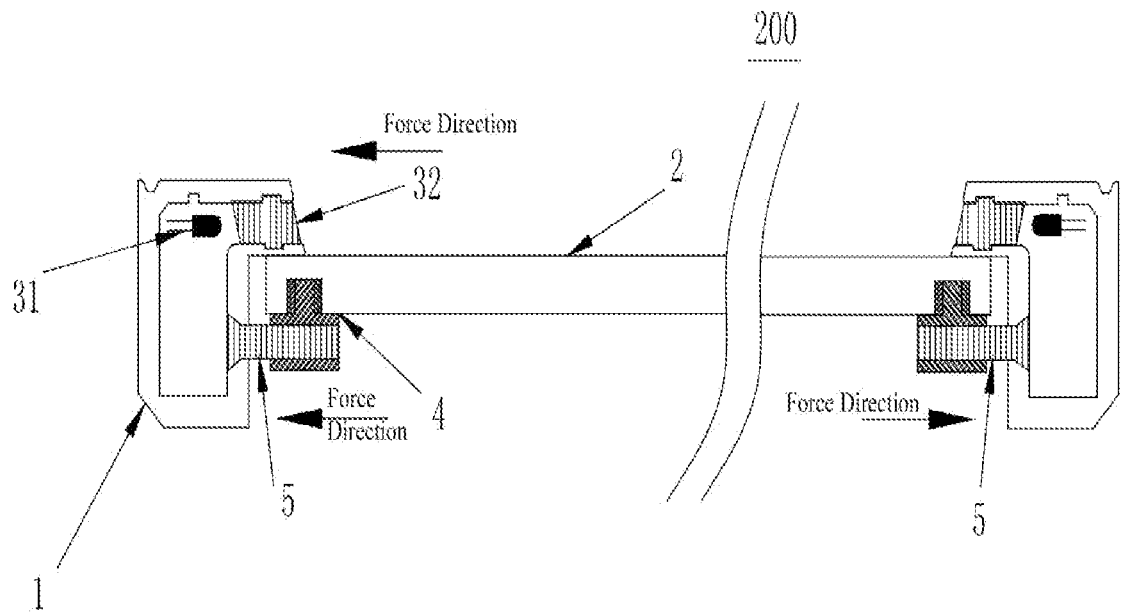
FIG. 3 is a schematic view of a touch device according to a second embodiment of the present disclosure.
Figure 4:
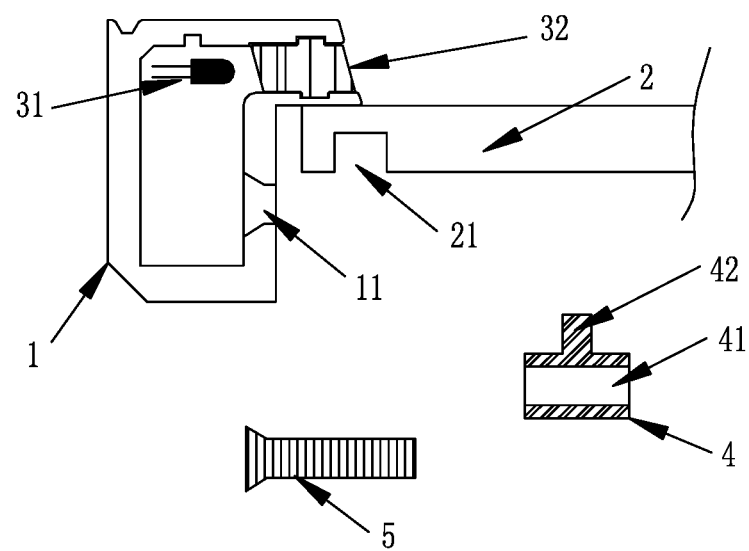
FIG. 4 is an exploded view of the touch device according to the second embodiment of the present disclosure.

As shown in FIG. 3 and FIG. 4, the touch device 200 according to this embodiment has the basically same structure as that of the touch device 100 according to Embodiment 1, and the difference is illustrated as below.

The connecting block 4 and the substrate 2 according to this embodiment are connected not by bonding. In this embodiment, the connecting block 4 is inserted into the substrate 2. Specifically, a connecting column 42 extends upward from the upper surface of the connecting block 4, a connecting hole 21 corresponding to the connecting column 42 is provided in edge region on the lower surface of the substrate 2, and the connecting hole 21 is filled with an edge-breakage prevention material to prevent the substrate 2 from being damaged due to the connection with the connecting block 4. In this embodiment, the connecting hole 21 is a blind hole. The connecting column 42 is inserted into the connecting hole 21 to achieve the connection between the connecting block 4 and the substrate 2. When the touch device 200 is assembled, by rotating the adjusting member 5, the tensile force applied by the adjusting member 5 onto the connecting block 4 is transmitted to the substrate 2 via the connecting column 42, and the surroundings of the substrate 2 are subjected to lateral tensile force, thereby ensuring that the flatness of the upper surface of the substrate 2 can reach the expected value.

Embodiment 3

Figure 5:
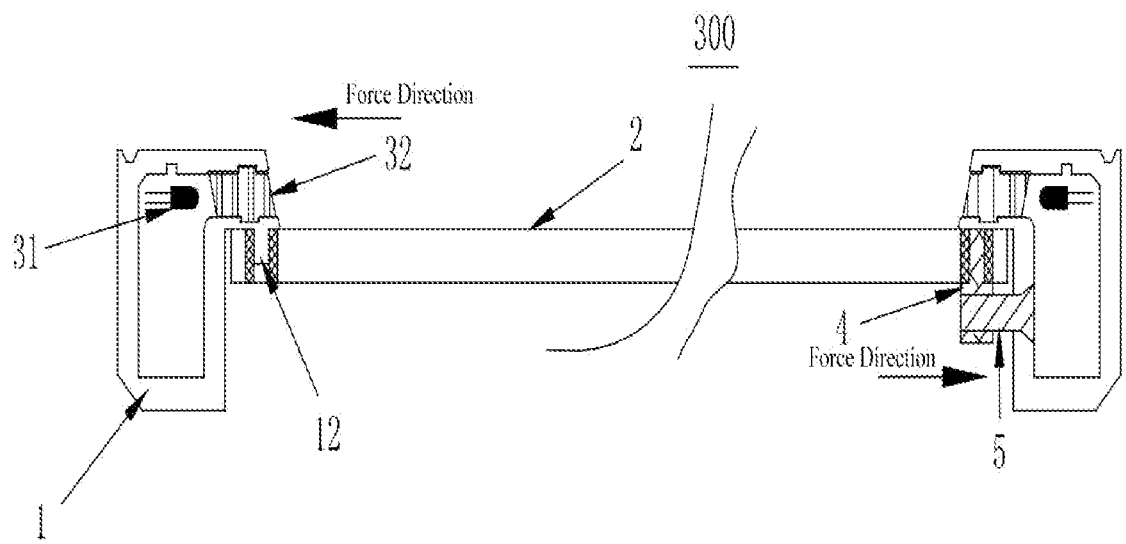
FIG. 5 is a schematic view of a touch device according to a third embodiment of the present disclosure.
Figure 6:
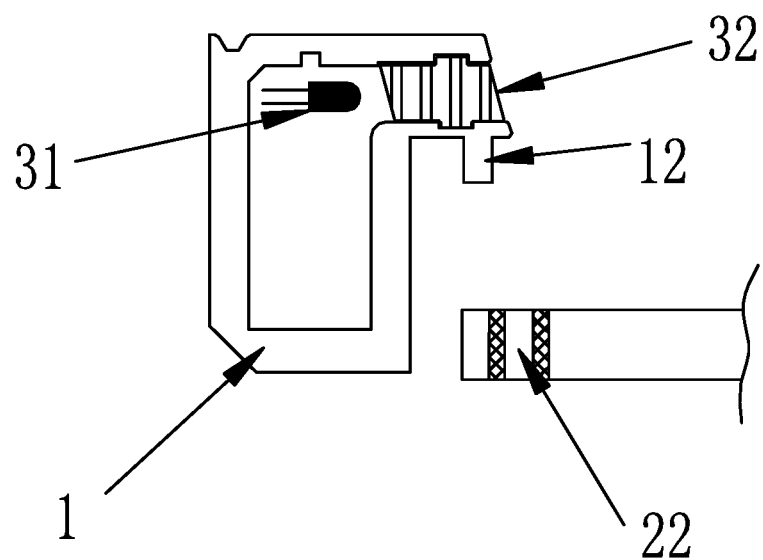
FIG. 6 is an exploded view of the touch device according to the third embodiment of the present disclosure.

As shown in FIG. 5 and FIG. 6, the touch device 300 according to this embodiment is an improvement on the touch device 100 according to Embodiment 1 or the touch device 200 according to Embodiment 2. The difference lies in that, of the two opposite sides of the substrate 2, the connecting block 4 is provided on one side, whereas the connecting block 4 is not provided on the other side.

In this embodiment, a fitting hole 22 is provided at the edge region on a side of the substrate 2 facing the connecting block 4. The fitting hole 22 is a through hole, and the fitting hole 22 is filled with an edge-breakage prevention material to prevent the substrate 2 from being damaged under the force after being punched. A fitting column 12 corresponding to the fitting hole 22 is provided on the frame 1, and the fitting column 12 extends downward from a surface of the frame 1 located above the substrate 2. When assembled, the fitting column 12 is inserted into the fitting hole 22. On the side where the connecting block 4 is provided, the connecting block 4 is connected with the adjusting member 5. Therefore, by adjusting the adjusting member 5, the substrate 2 will be subjected to lateral tensile force, thereby ensuring that the flatness of the upper surface of the substrate 2 can reach the expected value.

In an alternative implementation of this embodiment, the connecting block 4 is bonded to the lower surface of the substrate 2. In another alternative implementation, the fitting hole 22 is provided in the each of the edge regions all around the substrate 2, and of the opposite sides of the substrate 2, on one side where the connecting block 4 is provided, the connecting column of the connecting block 4 is inserted into the fitting hole 22, while on the other side, the fitting column 12 is inserted into the fitting hole 22.

Embodiment 4

Figure 7:
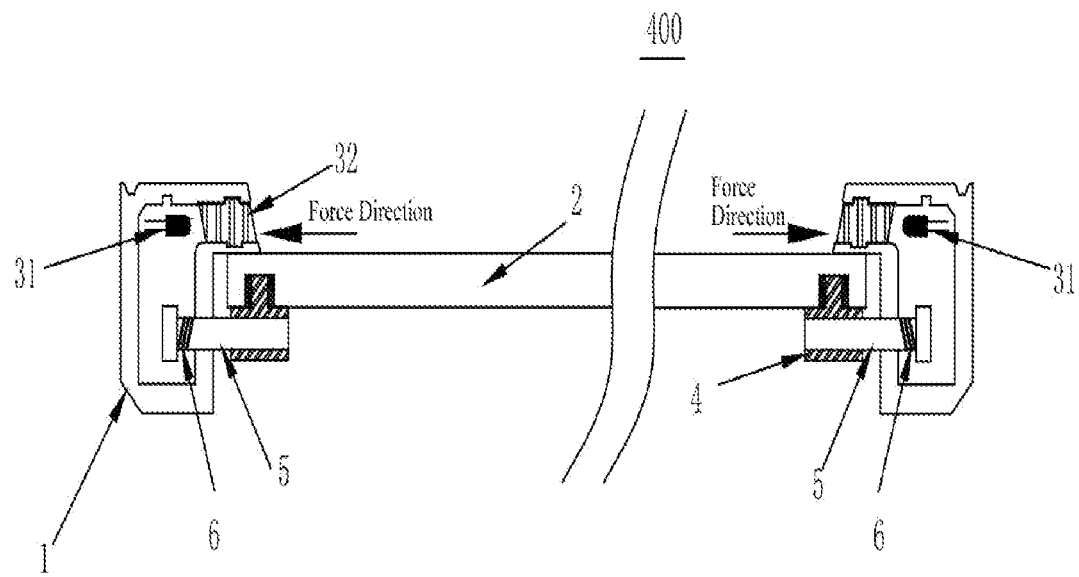
FIG. 7 is a schematic view of a touch device according to a fourth embodiment of the present disclosure.
Figure 8:
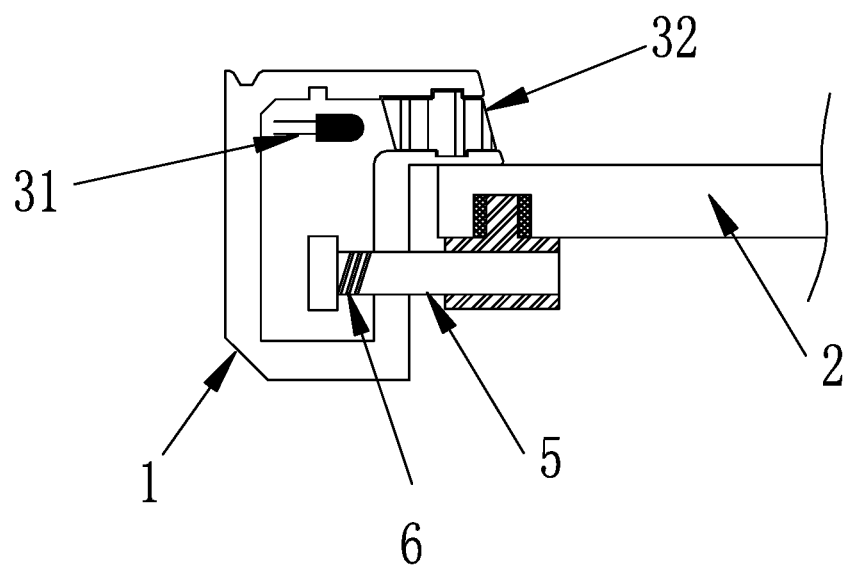
FIG. 8 is a partial enlarged view of the touch device according to the fourth embodiment of the present disclosure.

As shown in FIG. 7 and FIG. 8, the touch device 400 according to this embodiment is an improvement on the touch device 100 according to Embodiment 1, the touch device 200 according to Embodiment 2, or the touch device 300 according to Embodiment 3. The difference lies in that, a first elastic member 6 is disposed between the frame 1 and the nut of the screw. Optionally, in this embodiment, the first elastic member 6 may be a spring or a spring washer.

The improvement on the touch device 200 according to Embodiment 2 is taken as an example. In this embodiment, the screw mounting hole 11 is a through hole, and the screw mounting hole 11 has a diameter slightly larger than a diameter of the adjusting member 5 (i.e., screw). One end of the first elastic member 6 abuts against a side wall of the frame 1, and the other end thereof abuts against the nut of the screw. After the screw is rotated and the substrate 2 is subjected to lateral tensile force to make the flatness of the substrate 2 reach the expected value, the first elastic member 6 acts as a buffer for the substrate 2. When the substrate 2 is subjected to an external force, the first elastic member 6 provides a slight displacement for the substrate 2 to prevent the substrate 2 from being damaged due to excessive tight force.

Embodiment 5

Figure 9:
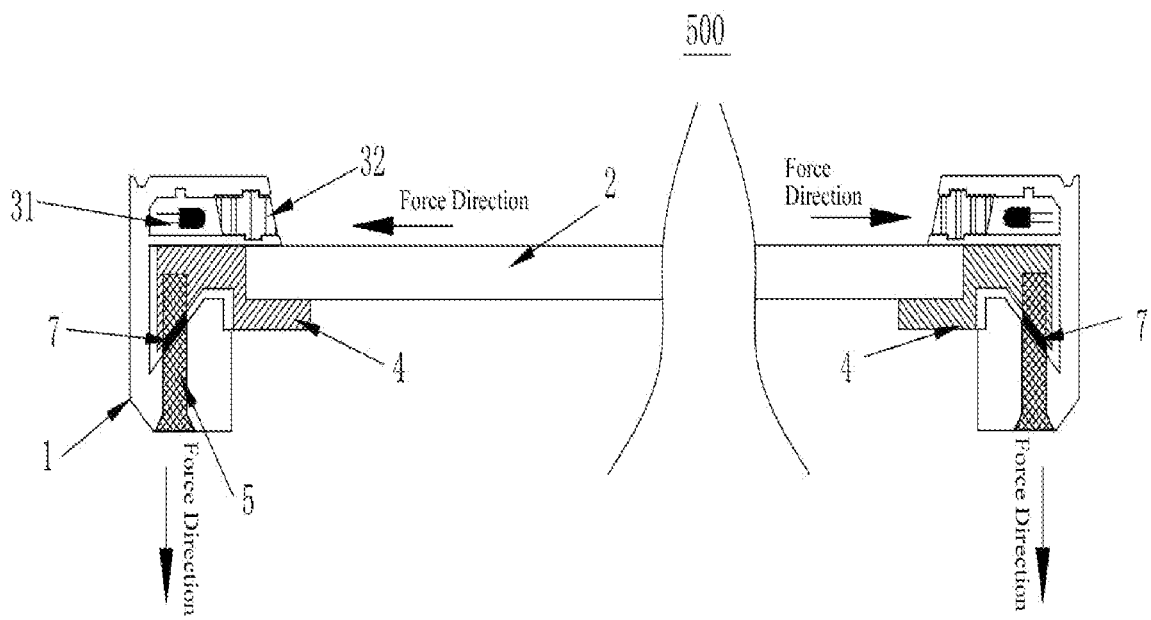
FIG. 9 is a schematic view of a touch device according to a fifth embodiment of the present disclosure.
Figure 10:
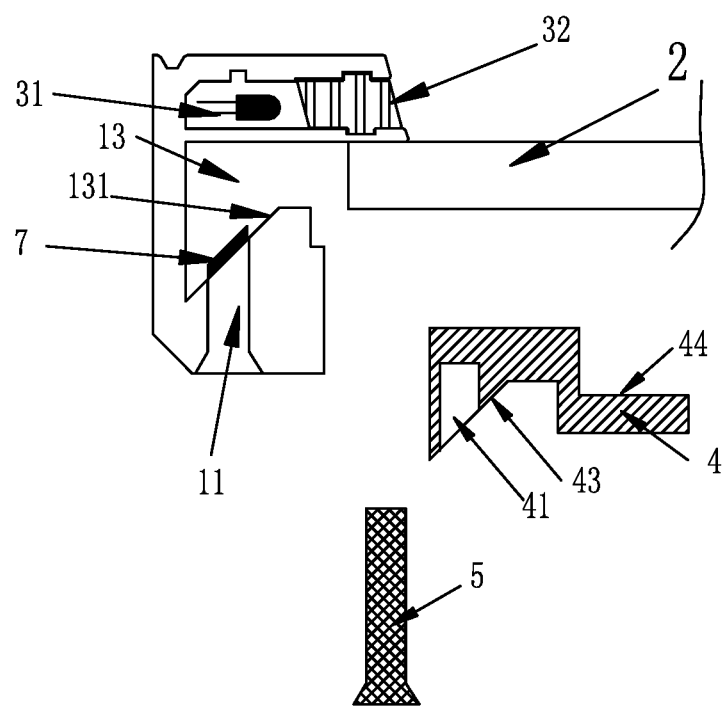
FIG. 10 is an exploded view of the touch device according to the fifth embodiment of the present disclosure.

As shown in FIG. 9 and FIG. 10, the touch device 500 according to this embodiment includes the frame 1, the substrate 2, the infrared emitting unit 31, the infrared receiving unit 32, the connecting block 4, the adjusting member 5 and a second elastic member 7.

The frame 1 is located around the periphery of the substrate 2. The frame 1 may be made of conventional profiles and can support various components of the touch device 500. The substrate 2 may be made of tempered glass. The infrared emitting unit 31 and the infrared receiving unit 32 are disposed on the frame 1 and located above the substrate 2. The infrared emitting unit 31 may be selected from an infrared lamp, and the infrared receiving unit 32 may be selected from an infrared sensing strip. The touch object can achieve the touch operation by changing the infrared rays on the contact points.

The connecting block 4 is connected to the edge region on the lower surface of the substrate 2. The connecting block 4 may be an aluminum block. Alternatively, other materials are possible. Optionally, the connecting block 4 includes a platform 44, and the platform 44 is bonded to the substrate 2 to support the substrate 2 from below the substrate 2. In this embodiment, the frame 1 includes a connecting-block mounting groove 13, and the connecting-block mounting groove 13 has a shape corresponding to that of the connecting block 4, and the connecting block 4 may be disposed in the connecting-block mounting groove 13.

Optionally, the bottom surface of the inner wall of the connecting-block mounting groove 13 is a first inclined surface 131, the bottom surface of the connecting block 4 includes a second inclined surface 43 corresponding to the first inclined surface 131, and the second inclined surface 43 is parallel to the first inclined surface 131. When the connecting block 4 is disposed in the connecting-block mounting groove 13, a second elastic member 7 is disposed between the first inclined surface 131 and the second inclined surface 43. The second elastic member 7 supports the connecting block 4. In this embodiment, the second elastic member 7 may be a spring or a spring washer.

The adjusting member 5 in this embodiment is a screw, the screw hole 41 is provided on the second inclined surface 43, and the screw hole 41 extends in a vertical direction. The screw mounting hole 11 corresponds to the screw hole 41 and also extends in the vertical direction. The adjusting member 5 (i.e., the screw) is connected to the threaded hole 41 from bottom to top in the vertical direction. Optionally, the second elastic member 7 is sleeved on the screw, and when the screw is rotated, the connecting block 4 is subjected to a downward force applied by the screw. Due to the support of the second elastic member 7 to the connecting block 4, the connecting block 4 moves slightly along the downward oblique direction of the second inclined surface 43, such that the connecting block 4 applies a lateral tensile force to the substrate 2, and the substrate 2 is straightened after subjected to the lateral tensile force, thereby ensuring the flatness of the upper surface of the substrate 2.

Embodiment 6

Figure 11:
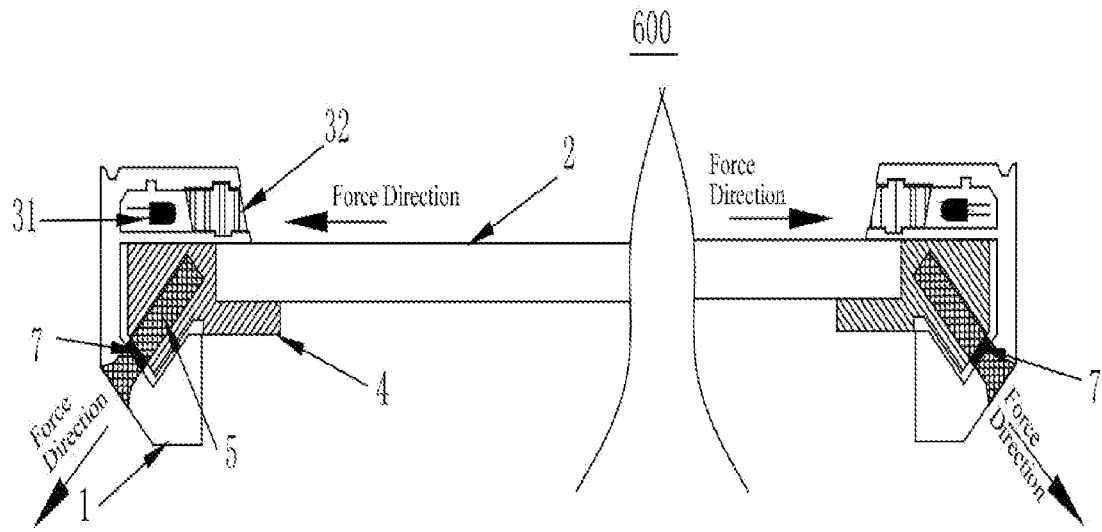
FIG. 11 is a schematic view of a touch device according to a sixth embodiment of the present disclosure.
Figure 12:
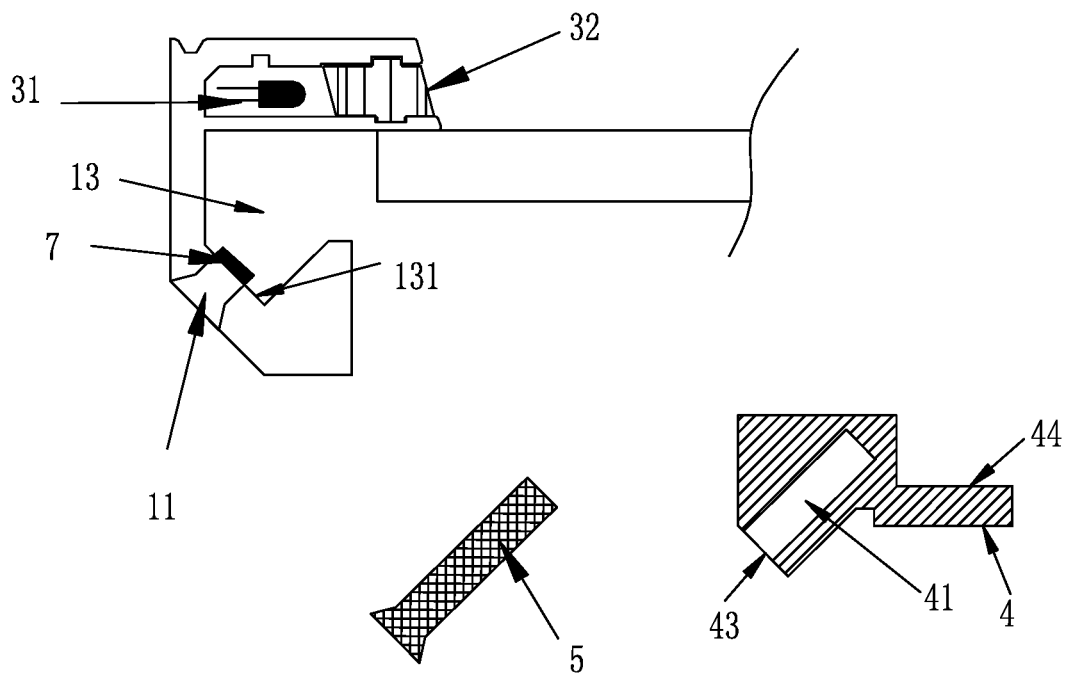
FIG. 12 is an exploded view of the touch device according to the sixth embodiment of the present disclosure.

As shown in FIG. 11 and FIG. 12, the touch device 600 according to this embodiment is an improvement to the touch device 500 according to Embodiment 5, and the difference is illustrated as below.

In this embodiment, the first inclined surface 131 is disposed on the side wall of the connecting-block mounting groove 13, and the first inclined surface 131 is connected to the bottom surface of the connecting-block mounting groove 13. The second inclined surface 43 is disposed on the side wall of the connecting block 4, and the second inclined surface 43 corresponds to the first inclined surface 131. The screw hole 41 is disposed on the second inclined surface 43, the screw hole 41 extends obliquely upward, and an extending direction of the screw hole 41 is perpendicular to the second inclined surface 43. The screw mounting hole 11 corresponds to the screw hole 41, and extends obliquely upward from the outer wall of the frame 1 to the first inclined surface 131.

The second elastic member 7 is disposed between the first inclined surface 131 and the second inclined surface 43. The adjusting member 5 (i.e., the screw) is connected to the threaded hole 43 obliquely upward. The second elastic member 7 is sleeved on the screw. When the screw is rotated, the connecting block 4 is subjected to a downward force applied by the screw. Due to the support of the second elastic member 7 to the connecting block 4, the connecting block 4 moves slightly along a downward oblique direction, such that the connecting block 4 applies a lateral tensile force to the substrate 2, and the substrate 2 is straightened after subjected to the lateral tensile force, thereby ensuring the flatness of the upper surface of the substrate 2.

In an optional implementation of this embodiment, the screw has an upward inclination angle of 45°. The 45° oblique structure in this embodiment is beneficial to apply the lateral tensile force to the substrate 2.

Therefore, the touch device of the present disclosure has a simple structure, and the substrate thereof does not need to be bent. Moreover, the touch device can be assembled conveniently and quickly, and the inspection process after assembly can be reduced, thereby lowering the cost of the touch device.

The embodiments of the present disclosure are described in detail above, and specific examples are used in this specification to illustrate the principles and implementation manners of the present disclosure. The description of the above embodiments is only used to help understanding of the methods and core ideas of the present disclosure. Meanwhile, any changes or modifications made by those skilled in the art based on the idea, the specific implementation and the application scope of disclosure, are all within the protection scope of the disclosure. In summary, the description of this disclosure should not be construed as a limitation on the present disclosure.

What is claimed is:

1. A touch device, comprising a frame, a substrate, an infrared emitting unit and an infrared receiving unit, the infrared emitting unit and the infrared receiving unit being disposed on the frame and located above the substrate, wherein the touch device further comprises:
   a connecting block, which is connected at an edge region on a lower surface of the substrate; and
   an adjusting member, which connects the connecting block and the frame and adjusts a lateral tensile force applied by the adjusting member to the substrate,
   wherein the adjusting member is a screw, a threaded hole is provided on the connecting block, a screw mounting hole corresponding to the threaded hole is provided on the frame, and the screw passes through the screw mounting hole to connect to the threaded hole, and
   wherein the connecting block is inserted into the substrate.

2. The touch device according to claim 1, wherein a fitting hole is provided at the edge region on a side of the substrate facing the connecting block, a fitting column corresponding to the fitting hole is provided on the frame, and the fitting column is inserted into the fitting hole.

3. The touch device according to claim 2, wherein a first elastic member is provided between the frame and a nut of the screw.

4. The touch device according to claim 1, wherein a first elastic member is provided between the frame and a nut of the screw.

5. A touch device, comprising a frame, a substrate, an infrared emitting unit and an infrared receiving unit, the infrared emitting unit and the infrared receiving unit being disposed on the frame and located above the substrate, wherein the touch device further comprises:
   a connecting block, which is connected at an edge region on a lower surface of the substrate; and
   an adjusting member, which connects the connecting block and the frame and adjusts a lateral tensile force applied by the adjusting member to the substrate,
   wherein the adjusting member is a screw, a threaded hole is provided on the connecting block, a screw mounting hole corresponding to the threaded hole is provided on the frame, and the screw passes through the screw mounting hole to connect to the threaded hole;
   wherein the frame comprises a connecting-block mounting groove, and the connecting-block mounting groove comprises an inner wall with a first inclined surface; and
   wherein the connecting block comprises a second inclined surface corresponding to the first inclined surface, the connecting block is disposed in the connecting-block mounting groove, and a second elastic member is disposed between the first inclined surface and the second inclined surface.

6. The touch device according to claim 5, wherein the first inclined surface is disposed on a bottom surface of the connecting-block mounting groove, the second inclined surface is disposed on a bottom surface of the connecting block, and the screw is connected to the threaded hole from bottom to top in a vertical direction.

7. The touch device according to claim 5, wherein the first inclined surface is disposed on a side wall of the connecting-block mounting groove, the second inclined surface is disposed on a side wall of the connecting block, and the screw is connected to the threaded hole obliquely upward.

8. The touch device according to claim 7, wherein the screw has an inclination angle of 45°.

* * * * *